Sept. 20, 1932.        R. H. VANSANT         1,878,034
                         FOLDABLE DOOR
                    Filed Oct. 24, 1930         7 Sheets-Sheet 1
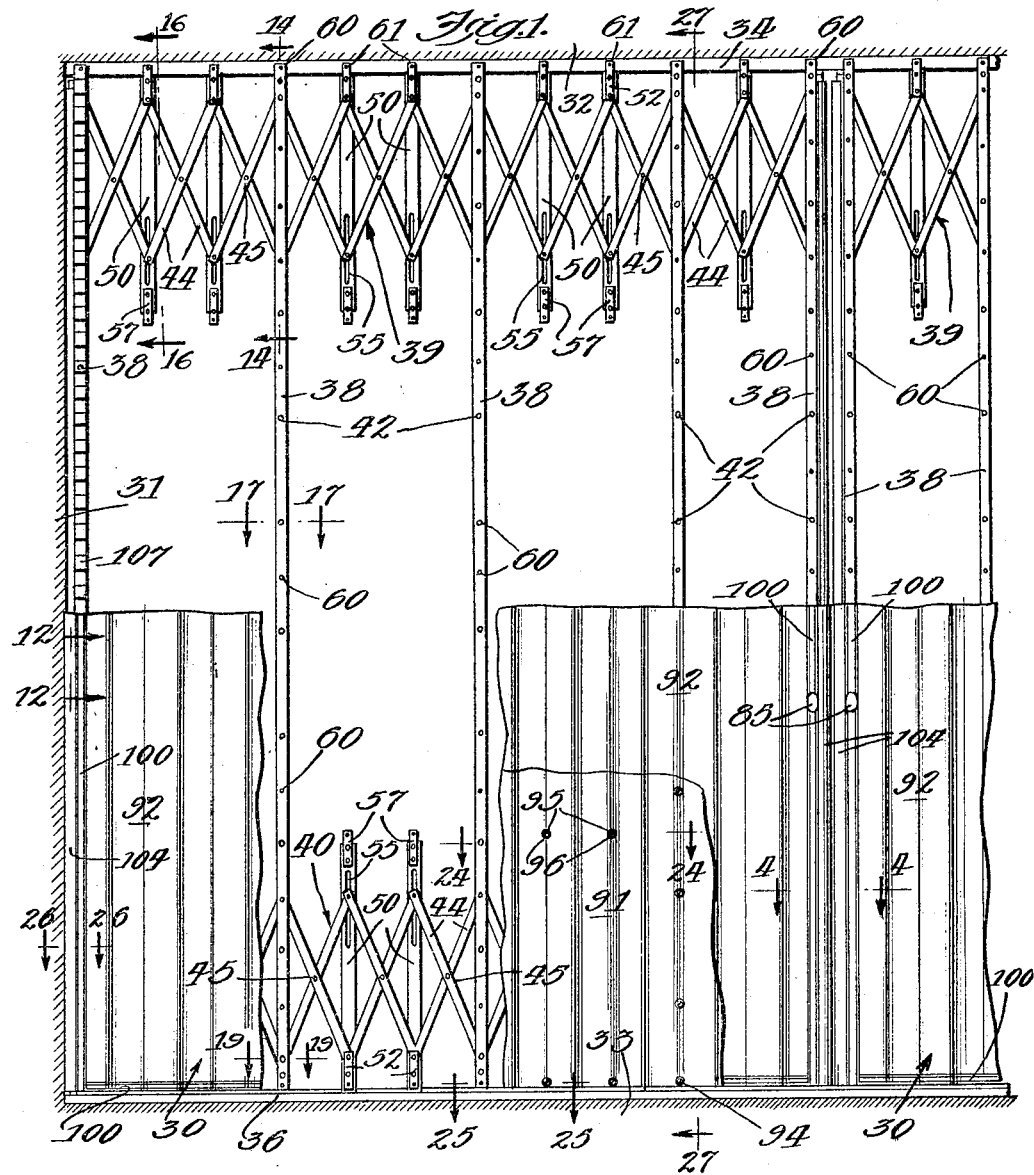
Inventor:
Richard H. Vansant
By Williams, Bradbury,
McCaleb & Hinkle.
Attys.

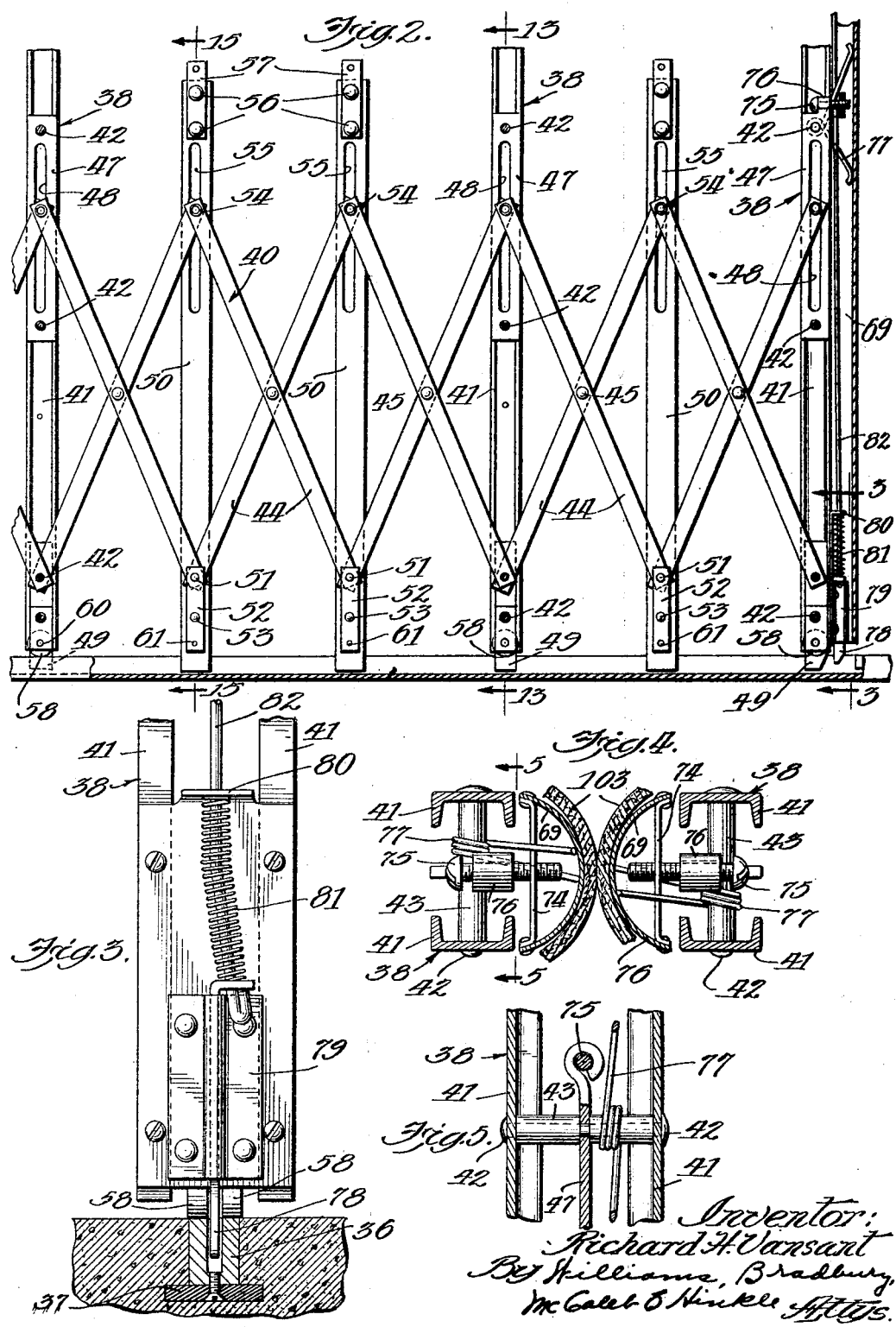

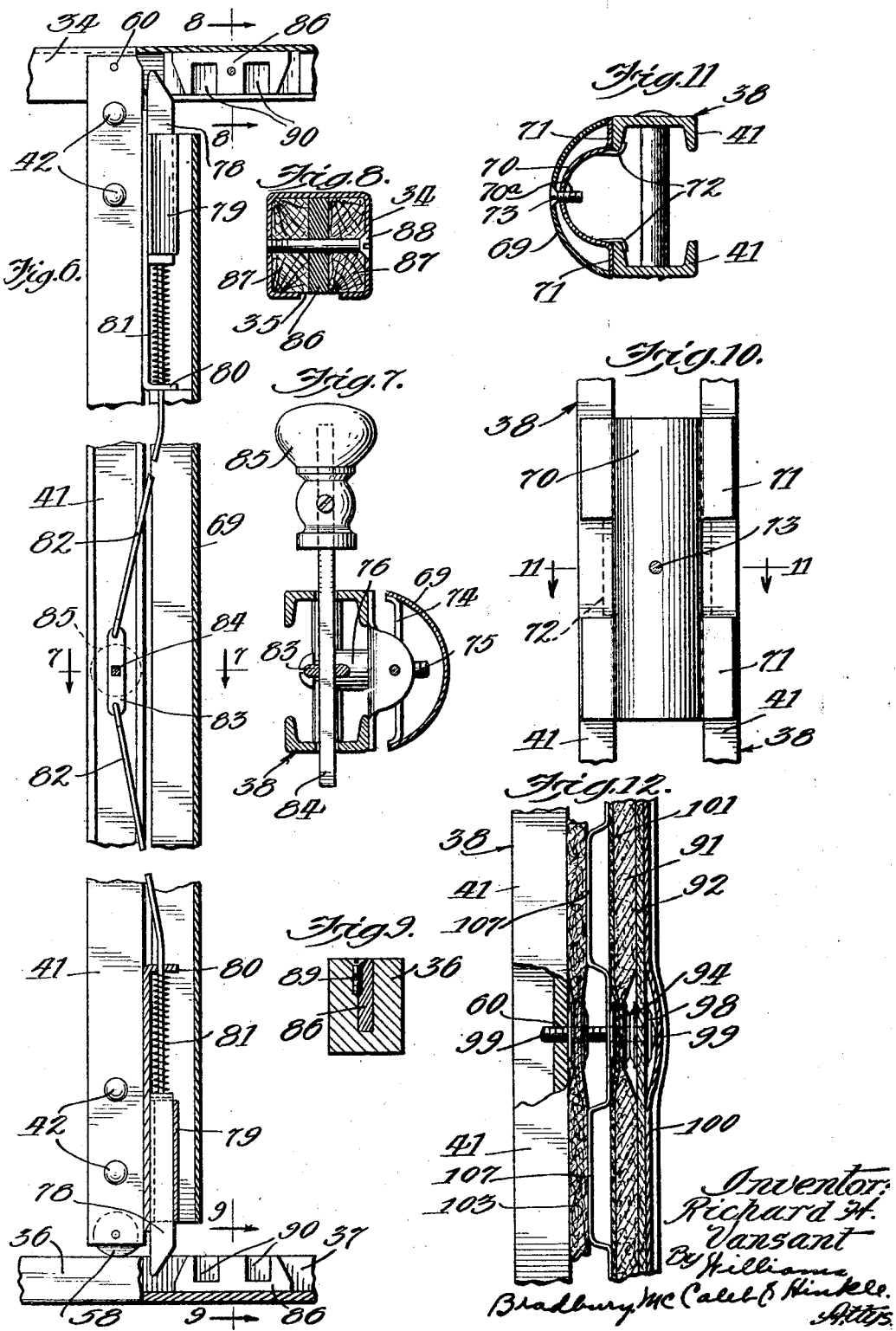

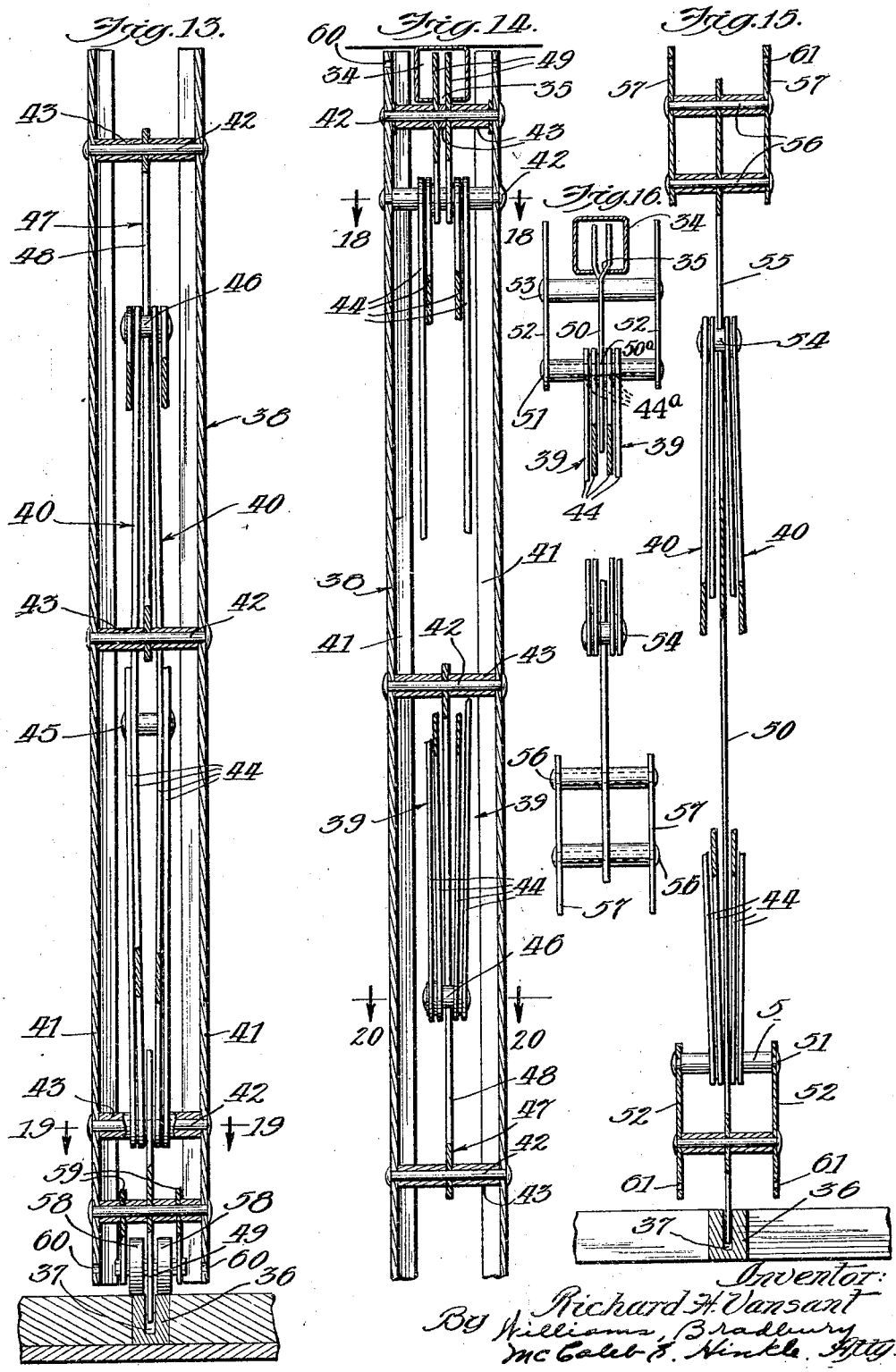

Sept. 20, 1932.   R. H. VANSANT   1,878,034
FOLDABLE DOOR
Filed Oct. 24, 1930   7 Sheets-Sheet 5
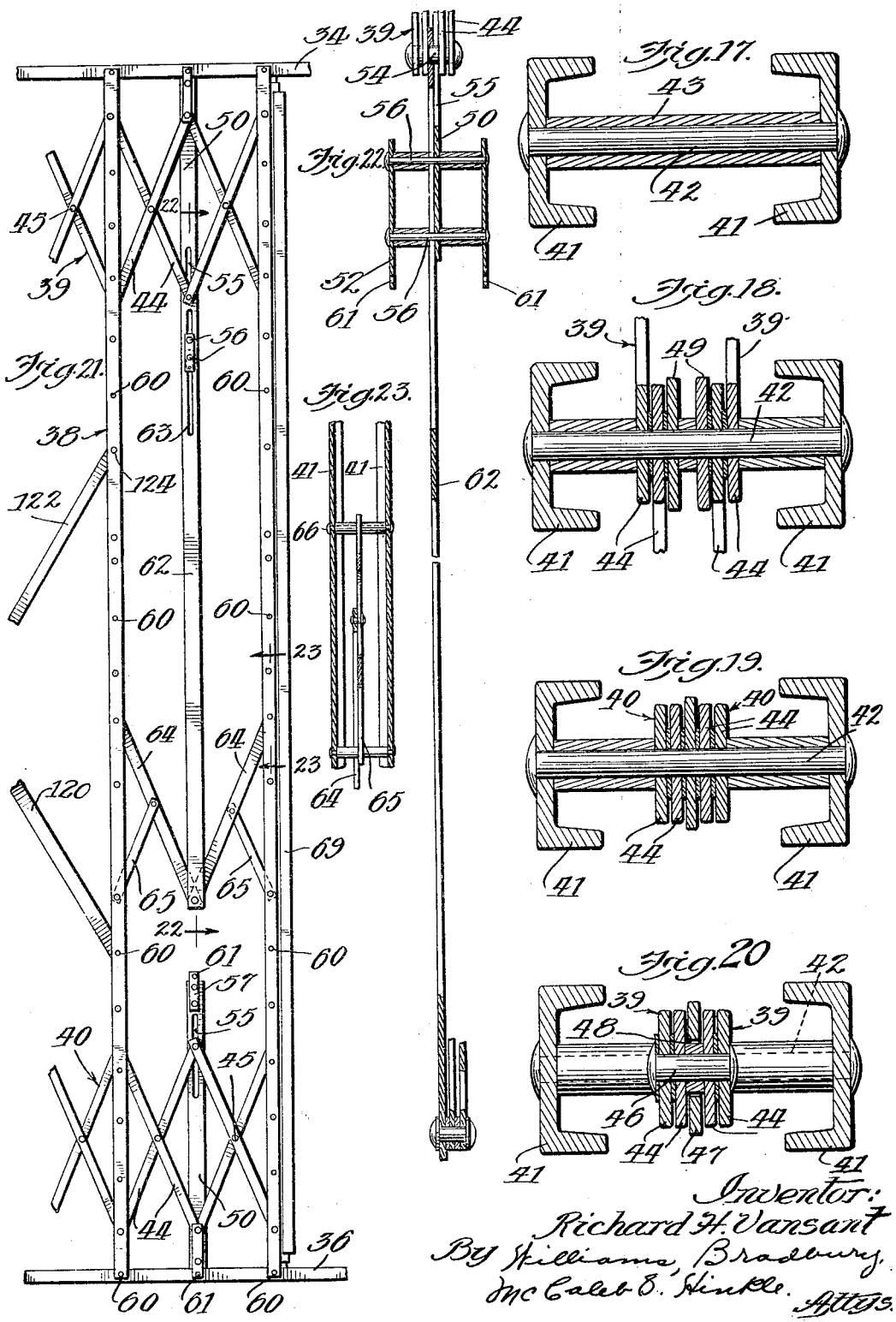

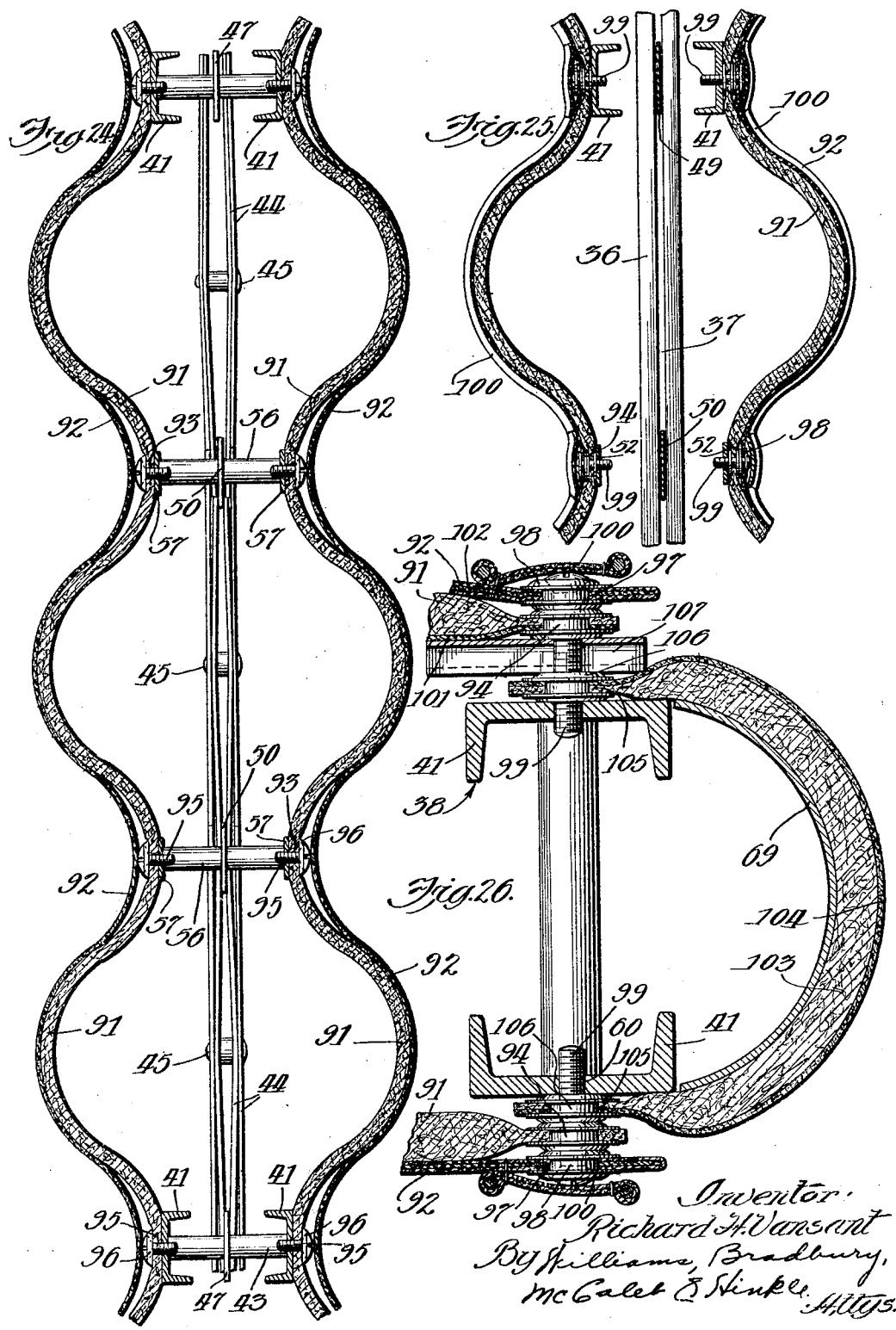

Sept. 20, 1932.   R. H. VANSANT   1,878,034
FOLDABLE DOOR
Filed Oct. 24, 1930   7 Sheets-Sheet 7
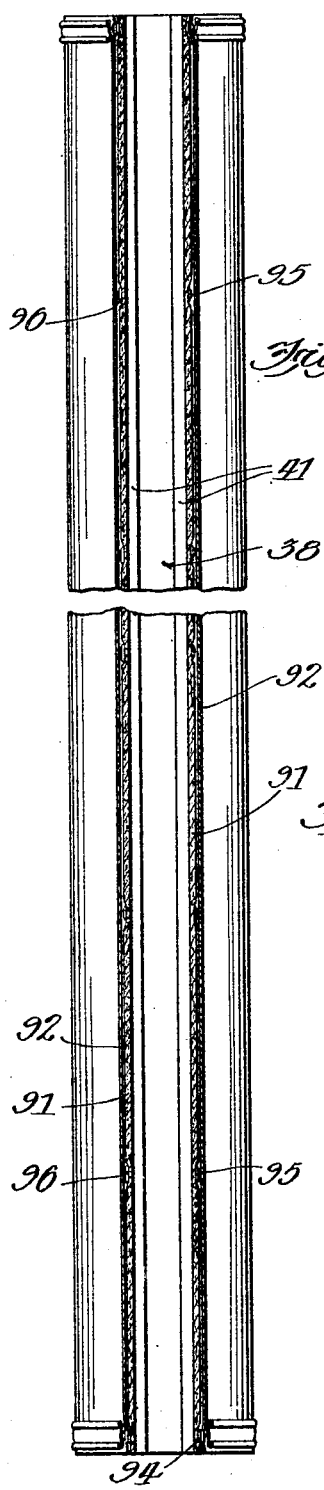
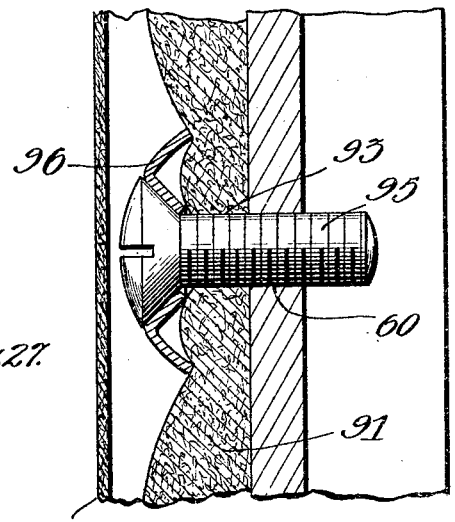
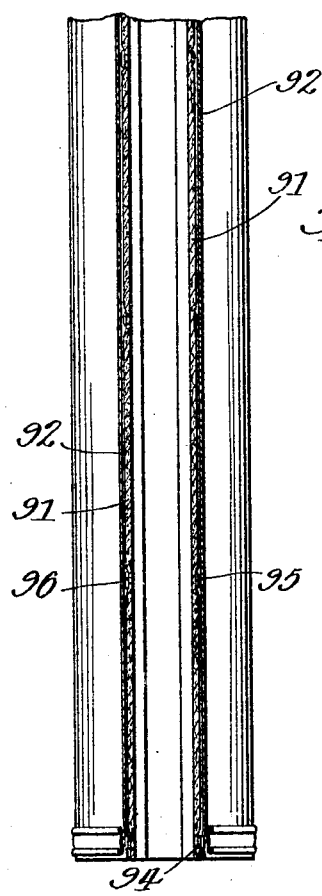
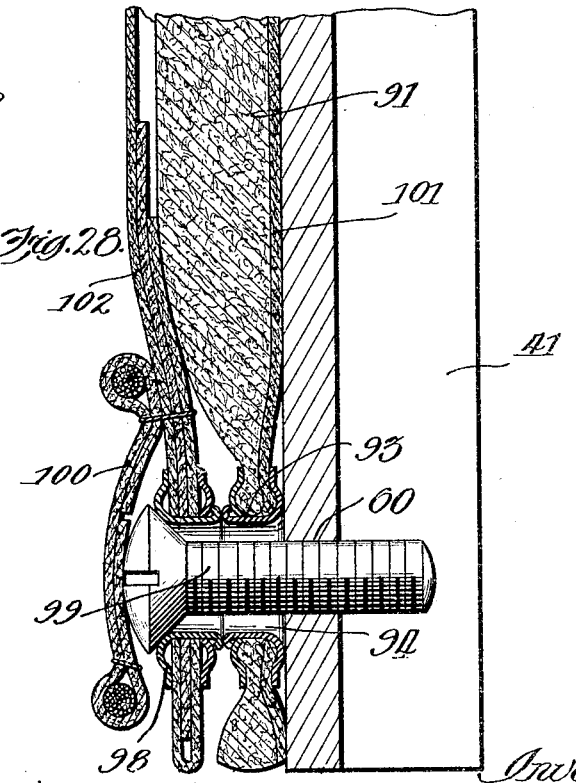
Inventor:
Richard H. Vansant
By Williams, Bradbury,
McCaleb & Hinkle, Attys.

UNITED STATES PATENT OFFICE

RICHARD H. VANSANT, OF CHICAGO, ILLINOIS

FOLDABLE DOOR

Application filed October 24, 1930. Serial No. 490,852.

This invention relates to foldable doors or partitions and more particularly to foldable doors or partitions of substantial size which are suitable for use to subdivide large rooms into smaller rooms and for other purposes.

One of the objects of the invention is to provide an improved foldable door or partition.

A further object of the invention is to provide an improved door framework adapted to support coverings of great size and weight.

A further object of the invention is to provide improved means for securing such coverings to the framework so that they may be readily mounted in position thereon and removed therefrom.

A further object of the invention is to provide a foldable door or partition including a framework and covering mounted on either side and having means for the escape of air from the space between the coverings when the door is collapsed.

A further object of the invention is to provide a door with an edge member resiliently mounted thereon.

A further object of the invention is to provide a door with an edge member adjustably supported thereon so that it may be adjusted to a vertical position or positions slightly out of vertical.

A further object of the invention is to provide an improved framework for a folding door of the type described, which is capable of easy manipulation and yet is extremely sturdy and substantial.

A further object of the invention is to provide a collapsible framework for a foldable door adapted to cooperate with upper and lower guides, the framework comprising stiles provided with guide engaging members, and members intermediate the stiles adapted to engage the guides.

A further object of the invention is to provide in a foldable door, an improved locking means for holding the door in a desired position.

A further object of the invention is to provide in a foldable door framework, an extensible member comprising a pair of straight line linkages located in spaced relation transversely of the curtain and having common pivots, whereby strength and rigidity of the framework are provided.

A further object of the invention is to provide an improved construction of stile for a foldable door.

A further object of the invention is to provide an improved intermediate support for a foldable door.

Other objects and advantages of the invention will appear more fully from the following description, and from the accompanying drawings, in which similiar characters of reference indicate similar parts throughout the several views.

Referring to the drawings:—

Figure 1 is a front elevational view of one foldable door embodying the invention and the adjacent abutting portion of a similar door, both doors having portions of their outer coverings removed to disclose the framework construction.

Fig. 2 is a fragmentary view partly in section, on a larger scale, showing the lower portion of the framework.

Fig. 3 is a transverse sectional detail view, on a larger scale, taken on line 3—3 of Fig. 2.

Fig. 4 is a horizontal sectional detail view, on the line 4—4 of Fig. 1.

Fig. 5 is a vertical sectional detail view, on the line 5—5 of Fig. 4.

Fig. 6 is an elevational view, partly in section, of one of the end stiles illustrating a locking mechanism.

Fig. 7 is a sectional detail view, on a larger scale, taken on line 7—7 of Fig. 6.

Fig. 8 is a sectional detail view, on a larger scale, taken on the line 8—8 of Fig. 6.

Fig. 9 is a sectional detail view, on a larger scale, taken on the line 9—9 of Fig. 6.

Fig. 10 is an elevational detail view, of one of the end stiles and an edge supporting clip mounted thereon.

Fig. 11 is a sectional detail view, on the line 11—11 of Fig. 10 showing an edge member secured to the clip.

Fig. 12 is a sectional detail view, on a larger scale, taken on the line 12—12 of Fig. 1.

Fig. 13 is a transverse sectional view, on a larger scale, taken on the line 13—13 of Fig. 2.

Fig. 14 is a transverse sectional view, on a larger scale, taken on the line 14—14 of Fig. 1.

Fig. 15 is a transverse sectional view, on a larger scale, taken on the line 15—15 of Fig. 2.

Fig. 16 is a transverse sectional detail view, on a larger scale, taken on the line 16—16 of Fig. 1.

Fig. 17 is a horizontal sectional detail view, on a larger scale, taken on the line 17—17 of Fig. 1.

Fig. 18 is a horizontal sectional detail view, on a larger scale, taken on the line 18—18 of Fig. 14.

Fig. 19 is a similar view taken on the line 19—19 of Fig. 13 or of Fig. 1.

Fig. 20 is a similar view taken on the line 20—20 of Fig. 14.

Fig. 21 is a fragmentary elevational view of a modified form of framework.

Fig. 22 is a transverse vertical sectional view taken on the line 22—22 of Fig. 21.

Fig. 23 is a sectional detail view, on a larger scale, taken on the line 23—23 of Fig. 21.

Fig. 24 is a horizontal sectional detail view, on a larger scale, taken on the line 24—24 of Fig. 1.

Fig. 25 is a horizontal sectional detail view, on a larger scale, taken on the line 25—25 of Fig. 1.

Fig. 26 is a horizontal sectional detail view on a larger scale, taken on the line 26—26 of Fig. 1.

Fig. 27 is a sectional view on the line 27—27 of Fig. 1, the internal framework mechanism being omitted for the sake of clearness, and Fig. 28 is a sectional detail view, on an enlarged scale, illustrated in a manner in which the outer covering is secured to the framework.

Referring to the drawings, and particularly Fig. 1, the foldable door is designated generally by the numeral 30. As shown in this figure, two such doors or partitions are used to close the opening defined by a side wall 31, a ceiling 32, and a floor 33. A guide rail 34 is secured to the ceiling in any suitable way, such guide rail being suitably constituted by a strip of metal formed to rectangular section and provided with the longitudinal slot 35 in its lowermost face. A corresponding guide rail 36 is provided in the floor beneath the guide rail 34. The guide rail 36 may suitably consist of a solid bar flush with the floor and provided with a longitudinal slot 37 which is open along the upper face of the rail.

The door 30 comprises an internal framework and outer coverings. The framework comprises a plurality of vertical stiles 38, an upper horizontally extensible member 39, and a lower extensible member 40, said members being connected to stiles, and normally holding same in spaced relation.

Each stile 38 preferably comprises a pair of uprights 41 of channel formation which have their side webs directed towards each other. The uprights 41 are held together by rivets 42, and are maintained in spaced relation by spacer washers 43 through which the rivets extend.

The upper extensible member 39 may suitably comprise a straight line linkage formed from a larger number of links 44. The links 44 are pivotally connected in pairs at their mid points by rivets 45. The adjacent ends of links of adjacent pairs are pivotally connected together as will be readily understood from Fig. 1, so that a straight line linkage results. The upper row of pivots of the upper extensible member 39 occupy positions of fixed altitude. Provision is made whereby the lower row of pivots may slide vertically when the door is being expanded or collapsed. In the embodiment of the invention illustrated, each of the extensible members 39 and 40 comprises a pair of such linkages as is shown more clearly in Figs. 13 to 20. Each pair of linkages has common pivots and, since they are spaced in the transverse direction of the door, impart considerable rigidity to the door against transverse displacement. This construction is particularly valuable in doors or partitions of considrable size.

As will be readily seen in Fig. 1, a plurality of pairs of links 44 are provided between adjacent stiles 38. The connection between the linkage 39 and the stiles will now be described. The upper pivotal connection of certain of the links 44 is provided by certain of the rivets 42 which are located near the upper ends of the stiles. This is best shown in Figs. 14 and 18. As will appear from these figures, suitable washers are mounted upon the rivets 42 to insure appropriate spacing of the links and permit their pivotal movement. The lowermost pivots corresponding to the pivotal connections just referred to are designated 46. A guide plate 47 provided with a vertical slot 48 is mounted mid-way between the uprights 41, suitably by means of certain of the rivets 42 and suitable spacer washers. The rivets 46 move freely in the vertical direction within the slot 48, and supply support to the stiles which tend to hold same against displacement from the vertical position. This construction is best seen in Figs. 14 and 20.

Adjacent the upper end of the stiles 38 and between the uprights 41 are mounted a pair of vertical plates 49 which extend into the slot 35 of the ceiling guide rail 34. The plates 49 may be mounted within the stiles in any suitable manner, but it is preferred to mount same upon the uppermost rivets 42, their position being assured by suitable spacer rivets in the same manner as the positioning of the guide plate 47 already described.

The uppermost and lowermost pivots of the extensible member 39, which are located between the stiles 38, are associated with intermediate vertical supports 50. As shown in Fig. 16, these uppermost pivots are provided by rivets 51 which extend through openings 44a, 50a in the links 44 and in the supports 50, suitable washers being interposed therebetween. These rivets also engage side plates 52 which are held apart by spacer washers, so that they occupy positions flush with the outer faces of the uprights 41, which constitute the stiles 38. These plates extend upwardly to the same height as stiles 38, and are secured together and to the supports 50 by means of rivets 53. The upper ends of the supports 50 are slit vertically and resulting portions bent as shown in Fig. 16, so as to enter into the slot 35 of the guide rail 34 and engage the sides thereof.

The lowermost pivots of the upper extensible member 39, located between the stiles 38 are provided by rivets 54 which extend through vertical slots 55 in the supports 50. Below the slots 55, the supports 50 carry rivets 56, which with the aid of suitable spacer washers, carry plates 57 which are in the same planes as the plates 52 and the outer faces of the stiles 38.

The end stiles differ slightly from the intermediate stile shown in Fig. 14 by reason of the fact that only half the number of links are associated therewith. It will be readily understood that this difference is accommodated by suitable modification of the spacer washers.

The lower extensible member 40 is substantially similar in its construction and its association with the stiles and the lower intermediate vertical supports, but is inverted in relation thereto so that its lowermost row of pivots are of fixed altitude, while its uppermost row of pivots move vertically. The lower extensible member is accordingly not described in detail, but the same numerals are employed to designate similar parts. Certain differences, however, are involved which will now be described. For the sake of appearance, the slot 37 is made as small as possible, and a single plate 49 is provided instead of the two plates 49 which enter the ceiling guide rail 34. For the same reason the lower ends of the lower intermediate vertical supports 50 are not modified and project directly into the slot 37 of the guide rail 36. The rail 36 receives the weight of the door which is applied thereto by pairs of rollers 58 rotatably mounted on a spindle which is supported in the guide plate 49 and plates 59 which are carried by the lowermost rivet 42 of each stile 38.

It will readily be understood that the invention is not intended to be limited to the fixed location of the outermost rows of pivots of the extensible members 39 and 40 upon the stiles 38 and intermediate supports 50, since the innermost rows of pivots may be fixed and the outermost rows of pivots provided with a sliding relation in the stiles and supports.

Each upright 41 of the vertical stiles 38 is provided with a series of tapped openings 60, and each of the plates 52 and 57 of both the upper and lower extensible members are provided adjacent their extremities with tapped openings 61. The openings 61 in the plates 52 are in alignment with the openings 60 at the upper and lower ends of the stiles 38, for a purpose which will hereinafter appear.

In the case of extremely heavy foldable doors, I may provide additional linkage elements to increase the rigidity of the framework. Thus as shown in Figs. 21, 22 and 23, I may provide a vertical brace 62, the upper end of which is pivotally connected to one of the rivets 54. Below this point of connection the brace 62 is provided with a vertical slot 63 through which extend the rivets 56. To the lower end of the brace 62 are pivotally connected upwardly directed links 64 which extend to the adjacent stiles 38. At intermediate points in their length the links 64 are pivotally connected to downwardly directed links 65 which in turn are pivotally connected to the adjacent stiles 38. At their upper ends the links 64 are provided with rivets 66 which extend through slots 67 in plates 68 mounted between the uprights 41 of the stiles 38 in the same manner as the guide plate 47 described above. While the brace 62 and its associated links have been described in association with the upper extensible member 39, it will be understood that such a brace may be associated with the lower extensible member 40, and that similar braces may be associated with both extensible members, if desired.

In using brace 62 and its associated parts it has been found that the end stile can be more easily extended and its edge will ordinarily be more nearly vertical than otherwise, due to the additional rigidity of its supports. Where this is done, it is also advisable to provide cross braces 120 and 122 placed between adjoining upright stiles 38. Cross braces 120 and 122 may be pivotally secured at their upper ends in upright stiles 38 upon suitable pivots 124 with their lower ends in sliding engagement with adjacent stiles. They will also be pivotally secured together at their midpoint.

The advantages of these additional braces for extremely large doors or partitions include the forming thereby of a stiffener between the stiles, prevent injury to the covering by pressure against otherwise unsupported portions thereof, add rigidity to the entire frame and thereby provide a more easily operable assembly.

It is preferred to provide each end stile with a rounded edge. This may be obtained by securing thereto an edge member 69 which may suitably be a strip of metal of arcuate cross section. Such edge member may be suitably secured upon the stile by means of a plurality of edge supporting clips 70, which are shown in Figs. 10 and 11. The clip 70 comprises an arcuate central portion of greater curvature than the edge member 69. The clip carries at each end lateral extensions 71 which are adapted to bear upon the extreme side flanges of the uprights 41 of the end stiles 38. Between the lateral extensions 71, the metal clip is formed into inwardly projecting tongues 72, the ends of which are bent upwardly so as to engage tightly the side webs of the uprights 41 as shown in Fig. 11. The clip 70 is provided with a tapped opening 70a which is adapted to receive a screw 73 by means of which the edge member 69 is secured thereto, the head of the screw 73 being countersunk in said member. A supporting clip 70 is provided at the top and bottom of each edge, and any desired number of such clips may be employed at intermediate points.

It is highly desirable to mount the edge member 69 so that it is capable of adjustment to enable it to cooperate with walls and abutting door edges which may be slightly off vertical. It is also desirable to mount the edge member resiliently so that it may exert a definite pressure against the wall or curtain edge against which it abuts. To obtain these results, a bridge piece 74 is rigidly secured to the edge member 69 at top and bottom and at intermediate positions, if desired. Each bridge piece 74 is provided with a tapped opening for the reception of a screw 75. The screws 75 are freely movable in collars 76 which are rigidly carried by the end stile 38. They may suitably be formed by bending extensions at the lower ends of the upper guide plates 47 and upper extensions of the lower guide plates 47 into substantially cylindrical form as shown in Figs. 2, 4 and 5. Suitable springs 77 are provided for projecting the edge member 69 outwardly from the adjacent stile 38. The springs may suitably be coil springs mounted upon the rivets 42 and having end lengths which bear upon the inner concave face of the edge member 69. It will readily be understood that the action of these springs is to press the edge member 69 outwardly, the outward movement being limited by the head of the screw 75 which is adapted to abut against the collar 76. When the door is pressed against a wall or against another door and locked in that position, for example by the locking means which is hereinafter described, the door edge presses against the abutting member with a resilient force, the heads of the screws 75 being displaced from the collars 76 as shown in Fig. 4. It will be readily understood that the screws 75 may be employed to adjust the edge member 69 into vertical position or into a position deviating slightly therefrom, and that they may also be employed to adjust the degree of movement of said edge member under conditions of use.

Suitable means are provided whereby either end stile may be locked in desired position. For this purpose bolts 78 may be mounted on the outer edge of the end stile 38 so as to normally project into the slots 35 and 37 of the guide rails 34 and 36 respectively. The bolts are carried in vertical housings 79 which are secured to the stile 38 and are provided with brackets 80 which serve as abutments for springs 81, which tend to maintain the bolts in their projected position. The bolts are connected by wires 82 to the opposite ends of an arm 83. The arm 83 is rigidly mounted upon a stem 84 which is rotatably mounted in opposed openings at a suitable position on the stile 38. The stem 84 carries an exterior handle 85 and preferably such a handle is provided on both sides of the door.

The bolts 78 are adapted to cooperate with locking blocks 86. The upper locking block is located in the center of the ceiling guide rail 34 and extends longitudinally thereof as shown in Fig. 6. On each side of the upper locking block is provided a wood block 87, and the three blocks are held in position by a screw 88 which extends through them from one side of the guide rail 34 to the other, with which it has a threaded connection. The lower locking block is located in the slot 37 of the floor guide rail 36, and is held in position immediately below the upper locking block by means of a keying screw 89. The locking blocks 86 are provided with recesses 90 adapted to receive the bolts 78. In the form shown in Fig. 6, two recesses are provided in each locking block for the purpose of holding two abutting doors together in the manner shown in Fig. 4. The forward edges of the locking blocks 86 and the ends of the bolts 78 are correspondingly bevelled so that, when the door is extended and the bolts 78 come into contact with the locking blocks 86, they are forced inwardly until the bolts are brought opposite the recesses 90 into which they enter. The door is held in this position until the handle 85 is rotated to effect its unlocking.

The frame covering, which may be applied to both sides or one side only if preferred, comprises an inner layer 91 of felt or other suitable material, and an outer layer 92 of velour, leather, or other desired material. The inner layer 91 is provided with openings 93 which are adapted to register with the tapped openings 60 in the stiles and the tapped openings 61 in the plates 52 and 57. The peripheral openings 93, that is the rows of openings adjacent the top, bottom and sides are provided with eyelets 94. The remaining openings 93 are applied to their corresponding openings 60 and 61 and screws 95 are passed therethrough and threaded into said openings 60 and 61. Washers 96, preferably of inverted V cross section, as shown in the upper part of Fig. 28 are associated with the screws 95 to increase their bearing surface and prevent tearing of the felt. The outer layer 92 of the covering is provided around its perimeter with openings 97, which are intended to register with the openings 93 which are located adjacent the top, bottom and sides of the inner layer 91. These openings are provided with eyelets 98. As shown in Fig. 28, the outer layer of the covering is secured to the framework by screws 99 which extend through the eyelets 98 and 94, and are threaded into the peripheral openings 60 and 61.

Finish strips 100 may be applied around the periphery of the door to conceal the screws 99 and the eyelets 98. Such strips may be formed from the same material as the outer layer 92, and may be provided with beaded edges to improve their appearance. Adjacent their edges, the inner layer 91 and the outer layer 92 may be provided with suitable reinforcing strips which are designated 101 and 102 respectively.

The vertical edges of the framework are preferably covered with the U-shaped strip of felt 103 carrying an exterior envelope of leather 104. This strip rests upon the outer surface of the edge member 69 and is provided at its edges with longitudinal series of openings 105 provided with eyelets 106, which openings are adapted to register with the openings 93 and 97 which are associated with the end stiles. As will be clearly seen in Fig. 26, the screws 99 passing into the threaded openings 60 of the end stiles, pass through the openings 105 and secure the strip 103 in position on the door edge.

It is preferred to make provision for the escape of air from the interior of the door when the same is collapsed. For this purpose, it is preferred to provide a corrugated strip of metal 107 along one or both sides of the door edge. As shown in Figs. 12 and 26, this strip may be located between the overlapping portions of the inner layer 91 and the edge covering 103, and is provided with openings through which the screws 99 pass, thereby holding the strip in position. As will be readily seen from Fig. 12, the strip 107 is formed from flat stock by bending it in reverse direction at intervals, so that it is divided into alternate lengths which are located in spaced planes, so that the strip possesses substantial bearing area in contact with both the inner layer 91 of the covering and the edge covering 103.

When the door or partition is collapsed or extended, the extensible members 39 and 40 will close or open uniformly, maintaining uniform spacing between the stiles 38 and the intermediate vertical supports 50. The result is that the exterior coverings form themselves into uniform folds as shown in Fig. 24. Since the outer covering 92 is secured to the framework exclusively around its perimeter, this covering presents a free flowing unpuckered appearance.

As indicated above, the upper row of pivotal points of the extensible member 39 have a fixed altitude, the pivots being carried by the stiles 38 and the upper intermediate supports 50. The lowermost row of pivotal points of this extensible member move in vertical slots 48 and 55. It will readily be understood that these pivots apply forces to the stiles 38 and intermediate supports 50, which tend to maintain them in vertical positions irrespective of the altitude of the force tending to collapse or extend the door. The same remarks apply to the lower extensible member 40, which is similar to the extensible member 39, but is inverted with respect thereto.

Although the invention has been disclosed in connection with the specific details of a preferred embodiment thereof, it must be understood that such details are not intended to be limitative of the invention except insofar as they are set forth in the accompanying claims.

I claim:

1. In a foldable door or partition, in combination, a plurality of stiles, a door covering secured thereto, members extensible transversely with respect to the stiles and connected thereto, and shorter supports parallel to the stiles carried by the extensible members intermediate the stiles to which the covering is also secured.

2. In a foldable door, in combination, a plurality of stiles, a covering secured thereto, straight line linkages extensible transversely with respect to the stiles, and shorter supports parallel to the stiles and extending inwardly from opposed edges of the door between the stiles, transversely aligned apical pivots of the linkages having fixed positions on the stiles and supports, the opposite apical pivots of the linkages being movable in slots provided in the stiles and supports, and the covering being secured to said supports.

3. In a foldable door, in combination, a plurality of stiles, a door covering secured thereto, straight line linkages extensible transversely with respect to the stiles, and shorter supports parallel to the stiles and extending inwardly from opposed edges of the door between the stiles, the outermost pivots of the linkages having fixed positions on the stiles and supports, the innermost pivots of the linkages being movable in slots provided in the stiles and supports, and the covering being secured to said supports.

4. In a foldable door, in combination, a plurality of parallel stiles, a door covering secured thereto, a pair of straight linkages extending transversely of the stiles adjacent opposite ends thereof, and shorter supports parallel to the stiles and extending inwardly from opposed edges of the door between the stiles, the outermost pivots of the linkages having fixed positions in the stiles and supports, the innermost pivots of the linkages being movable in slots provided in the stiles and supports, and the covering being secured to said supports.

5. In a foldable door, in combination, a framework comprising a plurality of parallel stiles, extensible members connected to and transverse with respect to the stiles, and supports intermediate the stiles, parallel thereto and extending inwardly for part of the width of the door, the stiles being provided along their length and the supports being provided at their ends with tapped openings for the reception of screws for securing door coverings to the framework.

6. In a foldable door, in combination, a plurality of parallel stiles, extensible members extending transversely of the stiles and connected thereto, relatively short supports parallel to, and intermediate the stiles, said supports being connected to the extensible members and being located adjacent opposed door edges, and guide plates projecting from the outer ends of the stiles and supports adapted to cooperate with stationary guide rails.

7. In a foldable door, in combination, an end stile, an edge member mounted thereon, resilient means tending to project the edge member away from the stile, and adjustable means for limiting such projection.

8. In a foldable door, in combination, an end stile, an edge member of arcuate cross-section mounted thereon, resilient means tending to project the edge away from the stile, and screws having an abutment on the end stile limiting such projection, said screws having a threaded relation with the edge member, whereby the degree of projection may be limited.

9. In a foldable door, an end stile, an edge member, and regulable means securing the edge member to the end stile and permitting it to be adjusted to positions parallel and approximately parallel to the end stile.

10. In a foldable door, in combination, a plurality of parallel stiles, a member carried by each stile having a longitudinal slot, and an extensible member connected to the stiles, comprising a pair of straight line linkages located on opposite sides of the slotted members, said linkages having common apical pivots which have fixed positions on the stiles, and opposite apical pivots extending through the slots.

11. A foldable door comprising a collapsible framework, coverings secured to the framework on either side thereof, and means provided at an edge of the door defining ventilation openings between the covering and the framework, adapted to permit the passage of air into or out of the curtain interior upon expansion or contraction of the curtain.

12. A foldable door comprising a collapsible framework including an end stile, coverings secured to the framework on either side thereof, and a corrugated strip located between the covering and the end stile to provide openings for the passage of air.

13. A foldable door comprising a collapsible framework including an end stile, an edge member secured to the end stile, a flexible covering applied upon the edge member and overlapping the end stile, coverings applied to both sides of the framework overlapping the edge covering, and a corrugated strip applied to the end stile between overlapping coverings to provide openings for the passage of air.

14. A stile for a foldable door comprising opposed channel members with inwardly directed side webs, rivets provided with spacer washers securing the channel members assembled, guide plates secured between the channel members and projecting beyond the ends thereof, and a slotted plate supported between the channel members.

15. An intermediate support for a foldable door, comprising a strip, provided with a slot, and pairs of plates supported adjacent the ends of the strip on either side of the strip and in spaced relation thereto, the strip projecting beyond the plates at one end to provide a guide for the door.

16. In a foldable door, in combination, parallel stiles, a straight line linkage having outermost pivots secured to the stiles, and innermost pivots slidable thereon, a brace pivotally connected to one of the innermost pivots between adjacent stiles, links pivotally connected to the brace and having a slidable connection with the stiles, and links pivotally connected to the stiles and to intermediate points of the first said links.

17. In a foldable door, the combination of a plurality of upright frame members, extensible supporting members secured to said uprights near their upper ends and near their lower ends, upper and lower guide elements for said upright members, means secured to the lower edges of said upright members for supporting said door, guide elements secured to said extensible members intermediate said upright frame members, and an outer covering for said door secured at its side edges to said upright frame members and along its top and bottom edges to said upright frame members and to said guide elements.

18. A foldable closure member comprising a pair of end upright frame members, vertical stiles positioned between said end frame members, an extensible supporting member between said end members, said stiles being secured to said supporting member, an outer covering for said closure member, and an apertured member secured to one end member for allowing air to escape from said closure member while it is being collapsed.

19. In a foldable door, the combination of a pair of end upright frame members, an extensible supporting member secured between the upper ends of said upright members, and a second extensible supporting member secured between the lower ends of said upright members, a foldable flexible covering secured to said upright members and said extensible supporting members, and a resiliently supported edge member secured to one of said uprights.

20. A foldable door comprising a plurality of upright frame members, vertical extensible members secured to said upright members at their upper ends and at their lower ends, a flexible foldable covering member attached to said upright frame members and to said vertical extensible frame members on both sides thereof, means for locking said foldable door in an extended position, a resiliently supported extended edge member secured to an end upright, and ventilating means along an opposite edge of said door to permit egress or ingress of air.

21. In a foldable door, the combination of a plurality of upright frame members, upper and lower extensible supporting means connecting said frame members, supports shorter than and parallel to the frame members secured to the extensible supporting means, and a covering for said foldable door secured to said upright frame members and to said supports and tensioned between the upper and lower supports.

22. An end members for a foldable door frame comprising a pair of channel-shaped members positioned facing each other, spacers separating said frame members, a guide member positioned between said frame members, an extensible framework pivotally secured to said guide member, a U-shaped edge member positioned on one side of said channel-shaped members and carried by said guide member, and a spring member secured to said guide member yieldingly holding said edge member in an extended position.

23. In a foldable curtain an edge construction comprising a pair of end frame members of substantially U shape, said end frame members being secured together in spaced relation, a curved metal member extending from the outer surface of one end frame member to the outer surface of the other frame member and having a curved surface in between said frame members forming the edge of the door, and means for securing said curved member to said end frame members.

24. In a foldable curtain an edge construction comprising a pair of end frame members of substantially U shape, said end frame members being secured together in spaced relation, a curved metal member extending from the outer surface of one end frame member to the outer surface of the other frame member and having a curved surface in between said frame members forming the edge of the door, and means for securing said curved member to said end frame members comprising a metal member formed with split ends to engage on the opposite sides of the flanges of said end frame members and threaded means for securing the curved edge member and said latter metal member together.

25. In a foldable curtain the combination of a pair of vertically extending end frame members with upper and lower extensible frame members connecting the end frame members to form a substantially rectangular extensible frame work, a cover for said frame work, and a resilient edge construction for said frame work comprising a vertically extending frame member located inside the covering at the edge of said curtain and adapted to provide the cover with an edge of predetermined formation and means for movably mounting said latter vertical frame member on said curtain.

26. In a foldable curtain the combination of a pair of vertically extending end frame members with upper and lower extensible frame members connecting the end frame members to form a substantially rectangular extensible framework, a cover for said framework, a resilient edge construction for said framework comprising a vertically extending frame member located inside the covering at the edge of said curtain and adapted to provide the cover with an edge of predetermined formation, means for movably mounting said latter vertical frame member on said curtain, and resilient means for urging said latter vertical member outward from said framework.

27. In a foldable curtain an extensible framework comprising pairs of vertically extending stiles fixedly secured in spaced relation to each other, a pair of said stiles being located at each end of said curtain, and extensible means for each of the other ends of said curtain comprising a pair of uniformly extensible straight line linkages for each end of the curtain secured to said stiles, said straight line linkages being secured in spaced relation to each other at each end of the curtain forming a substantially rectangular framework consisting of two parts located in spaced relation to each other and substantially parallel to each other to increase the rigidity of the framework in a lateral direction.

In witness whereof, I hereunto subscribe my name this 22nd day of October, 1930.

RICHARD H. VANSANT.